(12) United States Patent
Murata et al.

(10) Patent No.: US 7,907,906 B2
(45) Date of Patent: *Mar. 15, 2011

(54) MOBILE STATION

(75) Inventors: Syuuichi Murata, Yokohama (JP); Akihide Otonari, Kasuya (JP); Yuka Araikawa, Fukuoka (JP); Junichi Niimi, Kunitachi (JP); Atsushi Tanaka, Yokohama (JP); Takahiro Matusaki, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1013 days.

This patent is subject to a terminal disclaimer.

(21) Appl. No.: 11/146,076

(22) Filed: Jun. 7, 2005

(65) Prior Publication Data

US 2006/0035594 A1    Feb. 16, 2006

(30) Foreign Application Priority Data

Aug. 16, 2004  (JP) .................................. 2004-236832
Sep. 1, 2004   (JP) .................................. 2004-254955

(51) Int. Cl.
*H04B 17/00*    (2006.01)

(52) U.S. Cl. ..................... 455/67.13; 455/509; 455/515; 455/550.1

(58) Field of Classification Search ............... 455/67.13, 455/509, 515, 550.1, 565, 567

See application file for complete search history.

(56) References Cited

U.S. PATENT DOCUMENTS

| | | | |
|---|---|---|---|
| 5,548,803 A | 8/1996 | Evans | 455/16 |
| 7,330,700 B2 * | 2/2008 | Aizawa | 455/67.13 |
| 2003/0035403 A1 * | 2/2003 | Choi et al. | 370/342 |
| 2004/0058687 A1 * | 3/2004 | Kim et al. | 455/452.2 |
| 2005/0022098 A1 * | 1/2005 | Vayanos et al. | 714/776 |

OTHER PUBLICATIONS

3$^{rd}$ Generation Partnership Project; Technical Specification Group Radio Access Network; Multiplexing and channel coding (FDD) (Release 6) 3GPP TS 25.212 V6.2.0 (Jun. 2004).*

3GPP TS 25.212 v6.2.0 (Jun. 2004); 3$^{rd}$ Generation Partnership Project; Technical Specification Group Radio Access Network; Multiplexing and Channel Coding (FDD) (Release 6).

3GPP TS 25.214 v6.2.0 (Jun. 2004); 3$^{rd}$ Generation Partnership Project; Technical Specification Group Radio Access Network; Physical Layer Procedures (FDD); (Release 6).

* cited by examiner

*Primary Examiner* — Tuan H Nguyen
(74) *Attorney, Agent, or Firm* — Murphy & King, P.C.

(57) ABSTRACT

The present invention, focusing on the fact that sometimes the channel (HS-SCCH) which notifies that data is to be transmitted will be received but it will be misdetected that there was a notification addressed to the receiving station, is to effectively utilize the channel (HS-SCCH) via which notification is conducted even in cases where the reception result is transmitted repeatedly. An HSDPA-compatible mobile station which, upon detecting that a message addressed to that mobile station was transmitted via HS-SCCH, receives the corresponding HS-PDSCH sub-frame, and which, when transmitting the reception result, repeats the transmission of said reception result n times, said mobile station being characterized in that it comprises a control unit which provides control such that reception processing is performed on the second sub-frame that comes next after the first sub-frame of HS-SCCH on which said detection was performed.

11 Claims, 6 Drawing Sheets

MOBILE STATION

CROSS REFERENCE TO RELATED APPLICATION

This application is related to and claims priority to Japanese Applications No. 2004-254955 filed Sep. 1, 2004, and No. 2004-236832 filed Aug. 16, 2004, in the Japanese Patent Office, the contents of which are incorporated by reference herein.

BACKGROUND OF THE INVENTION

1. Field of the Invention

The present invention relates to mobile stations, such as mobile stations in a mobile wireless communication system using a W-CDMA communication protocol.

2. Description of the Related Art

Currently, standardization of the W-CDMA (UMTS) protocol, a protocol for third generation mobile communication systems, is proceeding under the 3GPP (3rd Generation Partnership Project). HSDPA (High Speed Downlink Packet Access), which provides a maximum downlink transfer speed of approximately 14 Mbps, has been specified as one of the themes for standardization.

HSDPA is characterized in that it employs an adaptive modulation and coding (AMC) scheme, switching for example between the QPSK modulation scheme and 16-QAM scheme adaptively according to the wireless environment between the base station and mobile station.

Furthermore, HSDPA employs an H-ARQ (Hybrid Automatic Repeat ReQuest) scheme. Under H-ARQ, when a mobile station detects an error in data received from a base station, a retransmission request is made by the mobile station in question to the base station. The base station performs retransmission of data upon receiving this retransmission request, and thus the mobile station performs error correction decoding using both the already received data and the retransmitted received data. In this way, H-ARQ increases the gain of error correction decoding and reduces the number of retransmissions by effectively utilizing already received data, even if it contains errors.

The main wireless channels used in HSDPA include HS-SCCH (High Speed-Shared Control Channel), HS-PDSCH (High Speed-Physical Downlink Shared Channel) and HS-DPCCH (High Speed-Dedicated Physical Control Channel).

HS-SCCH and HS-PDSCH are both downlink (i.e. in the direction from the base station to the mobile station) shared channels. HS-SCCH is a control channel for transmitting various parameters relating to the data transmitted on HS-PDSCH. In other words, it is a channel which notifies (announces) that data is to be transmitted via HS-PDSCH.

The various parameters include, for example, modulation scheme information indicating which modulation scheme is used to transmit data on HS-PDSCH, the spreading code allocation number (code number), information on the rate matching pattern applied to the transmitted data, etc.

Furthermore, HS-DPCCH is an uplink (in the direction from the mobile station to the base station) dedicated control channel, which is used by the mobile station for sending ACK or NACK signals to the base station depending on whether or not there was an error in the data received via HS-PDSCH. Namely, it is a channel used for transmitting the reception result for data received via HS-PDSCH. If the mobile station fails to receive data (if the received data has a CRC error, etc.), a NACK signal will be transmitted from the mobile station and the base station will accordingly perform retransmission control.

In addition, HS-DPCCH is used by a mobile station, which has determined the reception quality (e.g. SIR) of the signal received from the base station, to transmit the results thereof periodically to the base station as CQI (Channel Quality Indicator) information. The base station judges the goodness of the downstream wireless environment based on the received CQI information, and if it is good, switches to a modulation scheme allowing transmission of data at higher speed, or switches to a modulation scheme which transmits data at a lower speed if the wireless environment is not good (i.e., performs adaptive modulation).

Channel Structure

Next, the channel configuration of HSDPA will be described.

FIG. 1 is a drawing which illustrates the channel configuration of HSDPA. Since W-CDMA employs a code division multiplexing scheme, the individual channels are separated by code.

First, the channels which have not been explained will be briefly described.

CPICH (Common Pilot Channel) and SCH (Synchronization Channel) are downlink shared channels.

CPICH is a channel for transmitting a so-called pilot signal, and is used by the mobile station for channel estimation, cell search and as timing reference for other downlink physical channels in the same cell. SCH strictly speaking includes P-SCH (Primary SCH) and S-SCH (Secondary SCH), and is a channel transmitted in bursts in 256 chips at the head of each slot. SCH is received by mobile stations which perform three-step cell search and is used for establishing slot synchronization and frame synchronization.

Next, the timing relationship of the channels will be described using FIG. 1.

As shown in the drawing, in each channel, one frame (10 ms) consists of 15 slots (each slot comprises a 2560 chip length). As described above, CPICH is used as a reference for other channels, so the head of the P-CCPCH and HS-SCCH frames is aligned with the head of the CPICH frame. Here, the head of the HS-PDSCH frame is delayed by 2 slots relative to HS-SCCH, etc., which is to make it possible for the mobile station to perform demodulation of HS-PDSCH with the modulation scheme corresponding to the received modulation scheme information via HS-SCCH. Furthermore, HS-SCCH and HS-PDSCH comprise sub-frames of 3 slots.

HS-DPCCH is an uplink channel. Its first slot is used for transmitting an ACK/NACK signal indicating the HS-PDSCH reception result from the mobile station to base station approximately 7.5 slots after the HS-PDSCH reception. Furthermore, the second and third slots are used for periodically transmitting CQI information as feedback for adaptive modulation control to the base station. Here, the transmitted CQI information is calculated based on the reception environment (e.g. the SIR determination result for CPICH) as determined in the period from 4 slots until 1 slot before the CQI transmission.

The ACK and NACK signals used for notifying whether reception of HS-PDSCH was or was not possible may be repeated multiple times depending on the settings.

Namely, as illustrated in FIG. 1, having received an HS-PDSCH transmission announcement in the first sub-frame (A) of HS-SCCH, the mobile station demodulates and decodes HS-PDSCH (first sub-frame E), which is delayed by two slots, performs a CRC check, and detects if any error is present.

Here, in the case where a determination of no error was made, as shown in the drawing, an ACK signal is transmitted in the first slot (slot C in the drawing) of the sub-frame delayed by approximately 7.5 slots from the HS-PDSCH reception, and transmission of the same ACK signal is repeated in the first slot (slot D in the drawing) of the subsequent sub-frame. Of course, if there was an error, a NACK signal would be repeatedly transmitted.

It is of course also possible to not have the reception result transmitted repeatedly, but repeating the transmission of the ACK signal or NACK signal N times in this manner (N is a natural number) ensures more reliable reception of the ACK signal or NACK signal by the base station and prevents unneeded retransmission control.

However, in order for transmission of the ACK signal or NACK signal to be repeated in the next sub-frame, HS-PDSCH cannot be transmitted to the same mobile station in the following N sub-frames, including the next sub-frame (F).

This is in order to prevent losing the ability to distinguish between whether the ACK signal (slot D in the drawing) is the repeated transmission of the reception result (ACK or NACK signal) relating to the first sub-frame E of HS-PDSCH corresponding to the first sub-frame A of HS-SCCH, or the initial transmission of the reception result (ACK or NACK signal) relating to the second sub-frame F of HS-PDSCH corresponding to the second sub-frame B of HS-SCCH.

Next, the content and coding procedure of the data transmitted on HS-SCCH will be described.

Data Transmitted on HS-SCCH

The following data are transmitted on HS-SCCH. These data are used for reception processing of HS-PDSCH, which is transmitted after a 2 slot delay.

(1) $X_{ccs}$ (Channelization Code Set information)
(2) $X_{ms}$ (Modulation Scheme information)
(3) $X_{tbs}$ (Transport Block Size information)
(4) $X_{hap}$ (Hybrid ARQ Process information)
(5) $X_{rv}$ (Redundancy and constellation Version)
(6) $X_{nd}$ (New Data indicator)
(7) $X_{ue}$ (User Equipment identity)

(1) through (7) will now be described.

(1) Xccs is a datum indicating the spreading code used for transmitting data on HS-PDSCH (e.g. a datum indicating a multi-code number and code offset combination), and consists of 7 bits.

(2) Xms is a datum indicating that the modulation scheme used on HS-PDSCH is either QPSK or 16-QAM, and consists of 1 bit.

(3) Xtbs is a datum used for computing the transport block size of data transmitted on HS-PDSCH (the size of data transmitted in one HS-PDSCH sub-frame), and consists of 6 bits.

(4) Xhap is a datum indicating the H-ARQ process number, and consists of 3 bits. The base station is unable to judge whether or not data was successfully received by the mobile station until the base station receives an ACK or NACK. However, if one were to wait until receiving an ACK or NACK before transmitting a new data block, the transport efficiency would drop. Thus, to allow transmission of new data blocks before an ACK or NACK is received, a process number is defined for each data block transmitted in a sub-frame, and the mobile station discriminates the reception processing it performs according to the process number. In other words, when performing retransmission, the base station assigns a process number to transport blocks under the condition that the same process number is assigned as that of the previously sent block, and transmits it via HS-SCCH as Xhap.

Therefore, the mobile station classifies the data received via HS-PDSCH based on the Xhap it has received, distinguishing between new transmission and retransmission within a data stream for which the same process number was provided via HS-SCCH based on Xnd, which will be discussed under (6), combining new data with retransmitted data, and the like.

(5) Xrv is a datum indicating the redundancy version (RV) parameters (s, r) and constellation version parameter (b) for HS-PDSCH retransmission, and consists of 3 bits.

s is a bit which indicates whether or not systematic bits are to be prioritized in the rate matching, which will be described later. For example, if s=1, the systematic bits are prioritized, and if s=0, the systematic bits are not prioritized. r indicates the bit pattern of puncture and repetition and b indicates the constellation rearrangement pattern for rate matching.

During retransmission, considering the combining on the receiving side, it is desirable to vary the transmitted bits or change the constellation arrangement, so Xrv is used by cycling it between 0 and 7. Furthermore, since there is no need to change Xrv for each initial transmission, the initial value for new transmissions can be fixed.

(6) Xnd is a datum indicating whether the block transmitted on HS-PDSCH is a new block or a retransmitted block, and consists of 1 bit. For example, when transmitting a new block, it would be switched from 0 to 1 or from 1 to 0, and for retransmission, it would not be switched and the same value would be used.

For example, when performing new transmission, retransmission, new transmission, retransmission, retransmission and new transmission in that order, the bits would change as follows: 1, 1, 0, 0, 0, 1.

(7) Xue is a datum indicating mobile station identification information, and consists of 16 bits.

Coding of Data Transmitted on HS-SCCH

FIG. 2 is a drawing illustrating the coding procedure (coding device) for the aforementioned data (1) through (7) which are transmitted on HS-SCCH. This coding is performed mainly by the base station.

In the drawing, 1 is a coding unit, 2 is a rate matching unit, 3 is a multiplier, 4 is a CRC computation unit, 5 is a multiplier, 6 is a coding unit, 7 is a rate matching unit, 8 is a coding unit and 9 is a rate matching unit.

Next, the operation of each block will be explained.

(1) Xccs, represented by 7 bits (x1,1~x1,7), and (2) Xms, represented by 1 bit (x1,8), are input into the coding unit 1 as a datum of 8 bits total. Here, the first number of the subscript signifies that this relates to data transmitted in the first part (first slot), and the second number, separated by a comma (,), indicates the number of the bit.

Coding unit 1 appends 8 tail bits to the input data and performs convolution coding with a code rate of ⅓ on the total of 16 bits. Therefore, the coded data becomes a total of 48 bits, and is supplied as z1,1~z1,48 to the rate matching unit 2. Rate matching unit 2 performs puncture or repetition processing or the like on specific bits to adjust them to a bit number that will fit into the first slot (here, assumed to be 40 bits), and outputs the result (r1,1~r1,40).

Data from the rate matching unit 2 is multiplied with c1~c40 by the multiplier 3 and output as s1,1~s1,40, and is transmitted in the first slot (first part), which is the slot at the head of the sub-frame of HS-SCCH in FIG. 1.

Here, c1~c40 are obtained by taking data from (7) Xue (xue1~xue16), appending 8 tail bits thereto and then convolution coding with a coding rate of ½ in coding unit 8 to obtain b1~b48, and further performing the same sort of bit adjustment in rate matching unit 9 as was done in rate matching unit 2.

Meanwhile, the 6-bit (3) Xtbs (x2,1~x2,6), 3-bit (4) Xhap (x2,7~x2,9), 3-bit (5) Xrv (x2,10~x2,12) and 1-bit (6) Xnd (x2,13) are input as a total of 13 bits y2,1~y2,13 together with the 16-bits y2,14~y2,29, for a total of 29 bits y2,1~y2,29, into coding unit 6.

Here, y2,14~y2,29 are obtained by performing CRC computation processing on the total of 21 bits of (1) through (6) in the CRC computation unit 4 and multiplying c1~c16, as the result of the computation, by (7) Xue (xue1~xue16).

The y2,1~y2,29 which are input into coding unit 6 have 8 tail bits added thereto and are convolution coded with a ⅓ coding rate and input as 111-bit data z2,1~z2,111 into the rate matching unit 7.

The rate matching unit 7 outputs 80 bits, r2,1~r2,80, by means of the aforementioned puncture or other such processing, and these r2,1~r2,80 are transmitted in the second part (second and third slots) in 1 sub-frame on HS-SCCH in FIG. 1.

As described above, the data of (1) and (2) are transmitted in the first slot, while (3) through (6) are transmitted in the second through third slots, thus being transmitted distinctly in separate slots; on the other hand, the CRC computation is carried out on them in common, with the CRC computation result being transmitted within the second slot, so detection of reception error becomes possible once both the first and second parts are completely received.

Furthermore, since the data to be transmitted in the first slot is convolution coded by coding unit 1 and then multiplied by (7) Xue in the multiplier 3, when data addressed to another station is received in the first slot, the likelihood generated in the decoding process will be smaller compared to if the data were addressed to the receiving station, thus making it possible to know if there is a high probability of the data not being addressed to the receiving station by comparing the likelihood to a reference value.

Coding of Data Transmitted on HS-PDSCH

Next, the process until the transmission data is transmitted via HS-PDSCH will be described using a block diagram.

FIG. 3 is a diagram illustrating a wireless base station.

In the drawing, 10 represents a control unit which successively outputs the transport data to be transmitted via HS-PDSCH (the data transmitted within one sub-frame) as well performing control of the various units (11 through 26, etc.). The values of (1) through (7) explained in FIG. 2 are given by this control unit 10.

Since HS-PDSCH is a shared channel, it is permitted for the successively output transport data to be addressed to different mobile stations.

11 represents a CRC attachment unit which performs CRC computation on the successively input transport data (data transmitted within the same wireless frame) and attaches the results of CRC computation to the tail of the transport data, and 12 represents a bit scrambling unit which imparts randomness to the transmitted data by applying a bit-unit scramble to the transport data with the CRC computation results attached thereto.

13 represents a code block segmentation unit which segments (e.g. into two equal parts) the input bit-scrambled transport data if it exceeds a certain data length, for the purpose of preventing the computation load of the receiving side decoder from increasing due to excessive length of the data to be coded in the subsequently performed channel coding, or for other purposes. The drawing shows a case where the input data length exceeded a specific data length and the output has been split into two equal parts (segmented into a first data block and second data block). Of course, cases where the number of segments segmented into is other than two are also possible, as are cases where the segments are not equal parts but have different data length.

14 represents a channel coding unit which performs error correction coding individually on each segmented datum. It is preferable to use a turbo coder for the channel coding unit 14.

Thus, the first output, for the first block, contains the important systematic bits (U) which are the same data as the data subjected to coding, the first redundancy bits (U') obtained by convolution coding of the systematic bits (U), and the second redundancy bits (U") obtained by interleaving and then similarly convolution coding the systematic bits. Likewise, the second output contains the systematic bits (U), first redundancy bits (U') and second redundancy bits (U") for the second block.

15 represents a bit separation unit which separates the first block and second block serially input from the channel coding unit 14 (turbo coder) into systematic bits (U), first redundancy bits (U') and second redundancy bits (U") and outputs them.

16 represents a first rate matching unit which performs rate matching, such as puncturing (thinning), on the input data so that the input data (in cases where data is segmented into multiple blocks, all the data of the segmented blocks) will be of a quantity that fits into a specific region of the subsequent virtual buffer unit 17.

17 represents a virtual buffer unit wherein a region is established by the control unit 10 according to the reception processing capacity of the mobile station to be transmitted to, in which region data rate-matched by the first rate matching unit 16 is buffered. For retransmission, by outputting the buffered data, the processing from the CRC attachment unit 11 to the first rate matching unit 16 can be omitted, but in cases where one wishes to modify the coding rate for retransmission or the like, it is desirable to re-output the transmission data stored in the control unit 10 and not use the buffered data. It is also possible to actually provide no buffer for the virtual buffer 17 and simply make it pass-through. In this case, retransmitted data would be re-output from the control unit 10.

18 represents a second rate matching unit for adjusting data to a length that can fit into a sub-frame designated by the control unit 10; it adjusts the data length of input data by performing puncture (thinning) and repetition processing so as to obtain the designated data length.

This second rate matching unit 18 performs rate matching according to the previously explained RV parameters.

Namely, depending on the RV parameters, when s=1, rate matching is performed so as to leave as many systematic bits as possible, and when s=0, it is permitted on the contrary to reduce the systematic bits and leave more redundancy bits. Furthermore, puncture and rate matching are preformed by a pattern that follows r.

19 represents a bit collection unit which arranges the data from the second rate matching unit 19 into a plurality of bit sequences. Namely, data of the first block and data of the second block are arranged according to a specific bit arrangement method to output a plurality of bit sequences for designating signal points on a phase plane. Since a 16-QAM modulation scheme is used in this embodiment example, the bit sequence consists of 4 bits. When using a 64-QAM modulation scheme, the bit sequence would be made 6 bits, and when using a QPSK modulation scheme, the bit sequence would be made 2 bits.

20 segments and outputs the bit sequences into the same number of branches as the spreading code number indicated by the control unit 10. Namely, it represents a physical channel segmentation unit which, when the code number in the transmission parameters provided by the control unit 10 is N, maps and outputs the input bit sequence sequentially to branches 1 through N.

21 represents an interleaving unit which performs interleaving on the bit sequences of N branches and outputs the result.

22 represents a constellation rearrangement unit for 16-QAM, which is capable of rearranging bits within each input bit sequence. Bit rearrangement is performed according to the previously described constellation version. Examples of bit rearrangement include swapping the high order and low order bits. It is preferable to perform bit swapping for multiple bit sequences according to the same rule.

23 represents a physical channel mapping unit which maps the bit sequences of N branches onto the corresponding spreading block of the subsequent spreading unit 24.

24 represents a spreading unit which comprises multiple spreading blocks, each of which outputs a corresponding I and Q voltage based on each bit sequence of N branches and performs spreading thereon with different spreading codes and outputs the result.

25 represents a modulating unit which combines the signals spread by the spreading unit 24, performs e.g. 16-QAM modulation scheme amplitude phase modulation on the result thereof, amplifies it by means of a variable gain amplifier, further frequency-converts it to a wireless signal, and then outputs it to the antenna side as a wireless signal to enable transmission.

Under HSDPA, it is possible to multiplex signals addressed to other mobile stations within sub-frames of the same timing by means of a spreading code, so it is desirable to provide a plurality of sets of 10 through 25, variable gain amplifier, etc. (these will be referred to as transmission sets), combine the output signals of the variable gain amplifiers, frequency-convert them together, and then transmit the result to the antenna side. Of course, since there is a need to separate by code, for the spreading code used by the spreading unit 24 of each transmission set, a different spreading code would be used so as to allow separation.

26 represents a receiving unit, which receives signals from the mobile station received via HS-DPCCH or the like, and provides ACK and NACK signals, CQI, etc. to the control unit 10.

As discussed above, if an ACK signal is received, the next new data is transmitted, but in the case of a NACK signal or a DTX state where there is no response, the control unit 10 performs retransmission control so as to retransmit the transmitted data.

Of course, as described above if the mobile station repeats the transmission of ACK and NACK signals, control would be performed so that data addressed to that mobile station will not be transmitted in the HS-PDSCH sub-frame corresponding to the repeated ACK signal or NACK signal transmitted by the mobile station, and retransmission control would be performed based on the repeatedly transmitted ACK signal or NACK signal.

Retransmission is limited to the maximum number of retransmissions that is set, and if no ACK signal is received from the mobile station upon reaching the maximum number of retransmissions, control is provided to switch to transmission of the next new data.

In cases where a maximum number of retransmissions is not defined, it is possible to start a timer from a new transmission and switch to transmission of the next new data when a specific time period is detected to have elapsed and no ACK signal has been received.

The foregoing was a description of the names and operation of the various units.

Matters relating to HSDPA as discussed above are disclosed for instance in 3G TS 25.212 (3rd Generation Partnership Project: Technical Specification; Group Radio Access Network; Multiplexing and channel coding (FDD)) and 3G TS 25.214 (3rd Generation Partnership Project: Technical Specification; Group Radio Access Network; Physical layer procedures (FDD)).

SUMMARY OF THE INVENTION

According to the background art described above, the mobile station receives a channel (HS-SCCH) which notifies that data is to be transmitted, and performs reception of data (HS-PDSCH) upon receiving a notification address to the station in question, and to this end, the mobile station monitors the channel (HS-SCCH) via which notifications are conducted.

Here, in cases where the reception result (ACK or NACK signal) is transmitted repeatedly, it is possible to reduce the power consumption of the mobile station by avoiding reception of the channel (HS-SCCH) via which notifications are conducted, but there is the possibility of problems arising in cases of misdetection that there was a notification addressed to the mobile station in question.

Thus, an objective of the present invention, focusing on the fact that sometimes the channel (HS-SCCH) which notifies that data is to be transmitted will be received but it will be misdetected that there was a notification addressed to the receiving station, is to effectively utilize the channel (HS-SCCH) via which notification is conducted even in cases where the reception result is transmitted repeatedly.

Providing beneficial effects, not limited to the above objective, derived from the various components of the best mode for practicing the invention as described below and which cannot be obtained from the prior art can also be positioned as an objective of the present invention.

(1) The present invention employs a mobile station which receives a first datum and transmits a first reception result with a first timing when a first notification was received via a channel which notifies that data is to be transmitted, and receives a second datum and transmits a second reception result with a second timing when a second notification with a different timing was received via said channel, said mobile station being characterized in that it comprises: a repeat transmission unit which, upon receiving said first notification, transmits said first reception result with said first timing, and repeats the transmission with said second timing; and a control unit which performs control such that, upon receiving said first notification, reception processing is performed with said different timing on said channel which notifies that data is to be transmitted.

(2) The invention employs a mobile station as set forth in (1), characterized in that said reception processing includes demodulation and decoding.

(3) The present invention employs an HSDPA-compatible mobile station which, upon detecting that a message addressed to that mobile station was transmitted via HS-SCCH, receives the corresponding HS-PDSCH sub-frame, and which, when transmitting the reception result, repeats the transmission of said reception result n times, said mobile station being characterized in that it comprises a control unit which provides control such that reception processing is performed on the second sub-frame that comes next after the first sub-frame of HS-SCCH on which said detection was performed.

(4) The invention employs a mobile station as set forth in (3), characterized in that said control unit determines said detection for said first sub-frame to have been correct when reception processing was performed for said second sub-frame but said detection was not achieved with said second sub-frame.

(5) The invention employs a mobile station as set forth in (4), characterized in that said control unit, upon making said determination, performs control which causes the reception result to be transmitted in a specific slot of HS-DPCCH corresponding to said first sub-frame, and causes the transmission of said reception result to be repeated n times in slots of subsequent sub-frames.

(6) The invention employs a mobile station as set forth in (3), characterized in that, when said detection is achieved also for said second sub-frame as a result of the reception processing for said second sub-frame, said control unit determines whether the detection of said first sub-frame or of said second sub-frame is more likely.

(7) The invention employs a mobile station as set forth in (6), characterized in that said control unit provides control such that the reception result is transmitted in the corresponding slot of HS-DPCCH which corresponds to the sub-frame determined to be more likely in said determination.

(8) The invention employs a mobile station as set forth in (6), characterized in that said control unit performs control such that, except for the transmission of reception results for repeats, reception results are not transmitted in the corresponding slot of HS-DPCCH which corresponds to the sub-frame which was not determined to be less likely in said determination.

(9) The invention employs a mobile station as set forth in (6), characterized in that said control unit performs control such that the reception result is caused to be transmitted in the corresponding HS-DPCCH slot which corresponds to the subframe determined to be more likely in said determination, and transmission of said reception result is furthermore repeated n times in slots of subsequent sub-frames.

(10) The invention employs a mobile station as set forth in (6), characterized in that said control unit performs said determination based on reliability information for the result of decoding of said first sub-frame and on reliability information for the result-of decoding of said second sub-frame.

(11) The invention employs a mobile station as set forth in (6), characterized in that said control unit performs said determination based on reliability information for the result of decoding of the HS-PDSCH sub-frame corresponding to said first sub-frame and on reliability information for the result of decoding of the HS-PDSCH sub-frame corresponding to said second sub-frame.

According to the present invention, even in cases where reception results are transmitted repeatedly, reception of the channel via which notifications are provided is actively performed, thus making it possible to effectively utilize the reception results.

For example, it becomes possible to detect when a notification was misdetected.

DETAILED DESCRIPTION OF THE PREFERRED EMBODIMENTS

Figure 1:
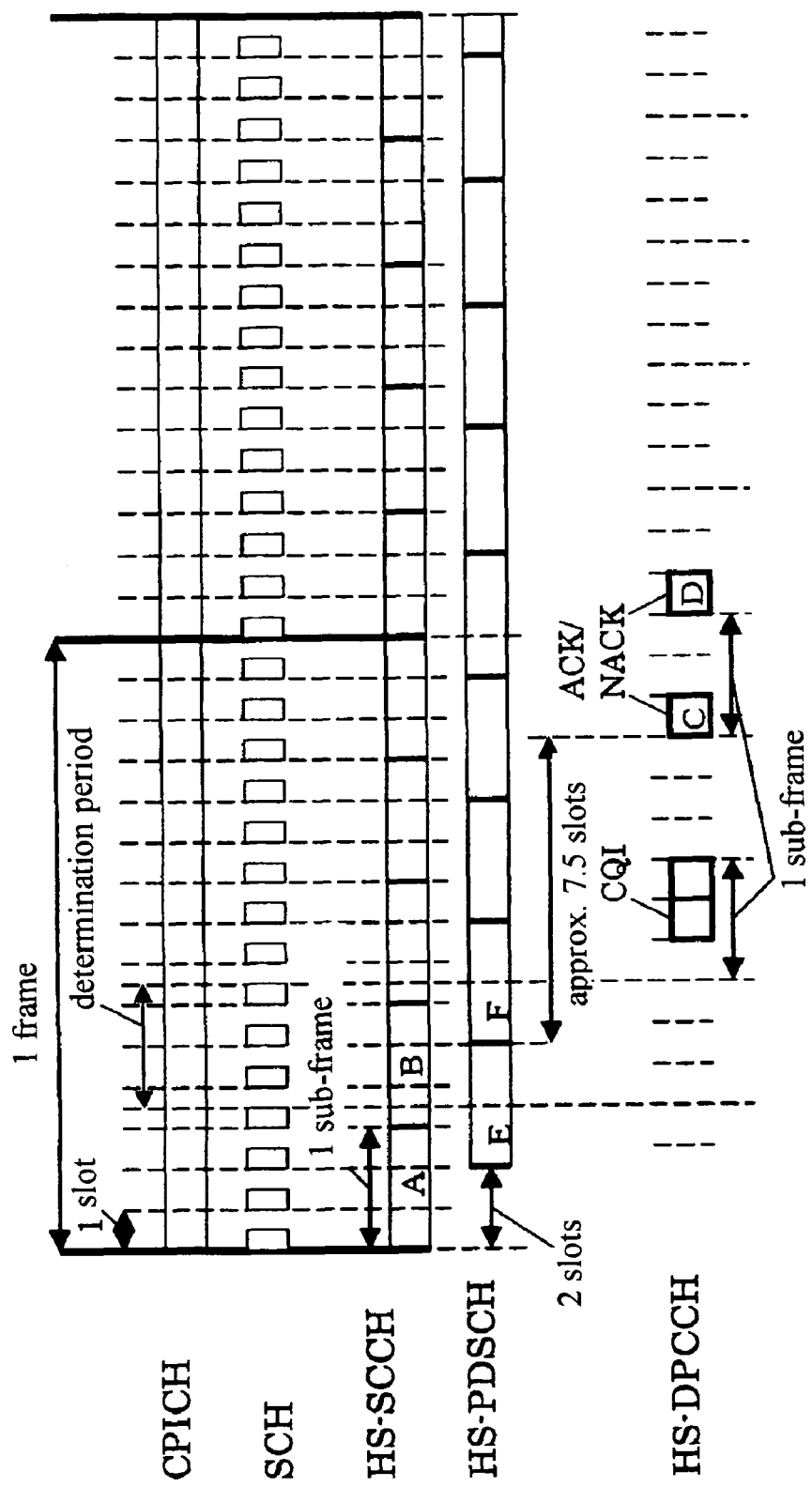
FIG. 1 is a drawing illustrating the channel configuration of HSDPA.
Figure 2:
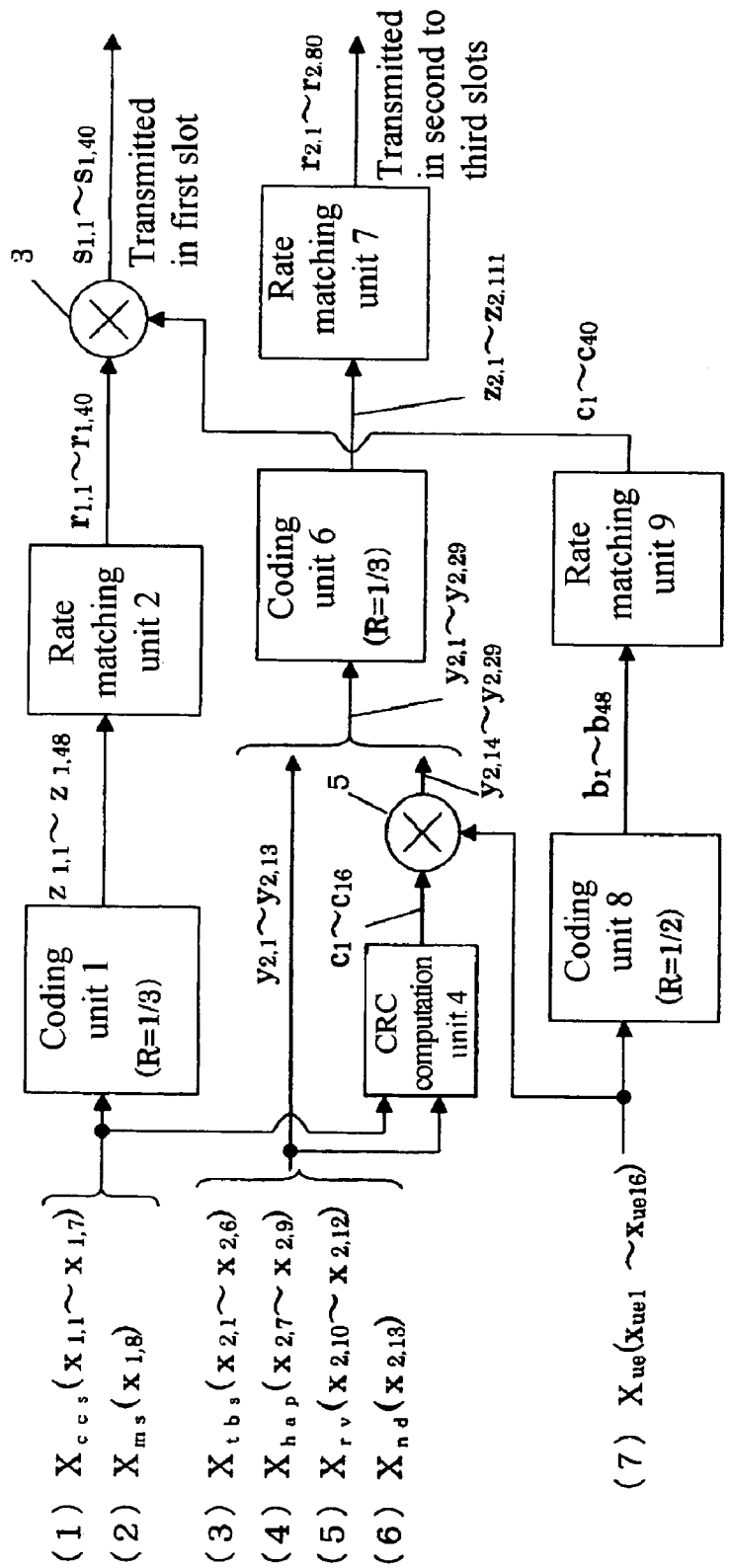
FIG. 2 is a drawing illustrating the HS-SCCH coding unit.

Below, modes for practicing the present invention are described by referring to the drawings.

(a) Description of First Embodiment

In the first embodiment, even in cases where it was detected that a message addressed to the receiving station was transmitted via HS-SCCH (a notification was made), the receiving station continues to actively demodulate and decode and make use of subsequent HS-SCCH transmissions.

Figure 4:
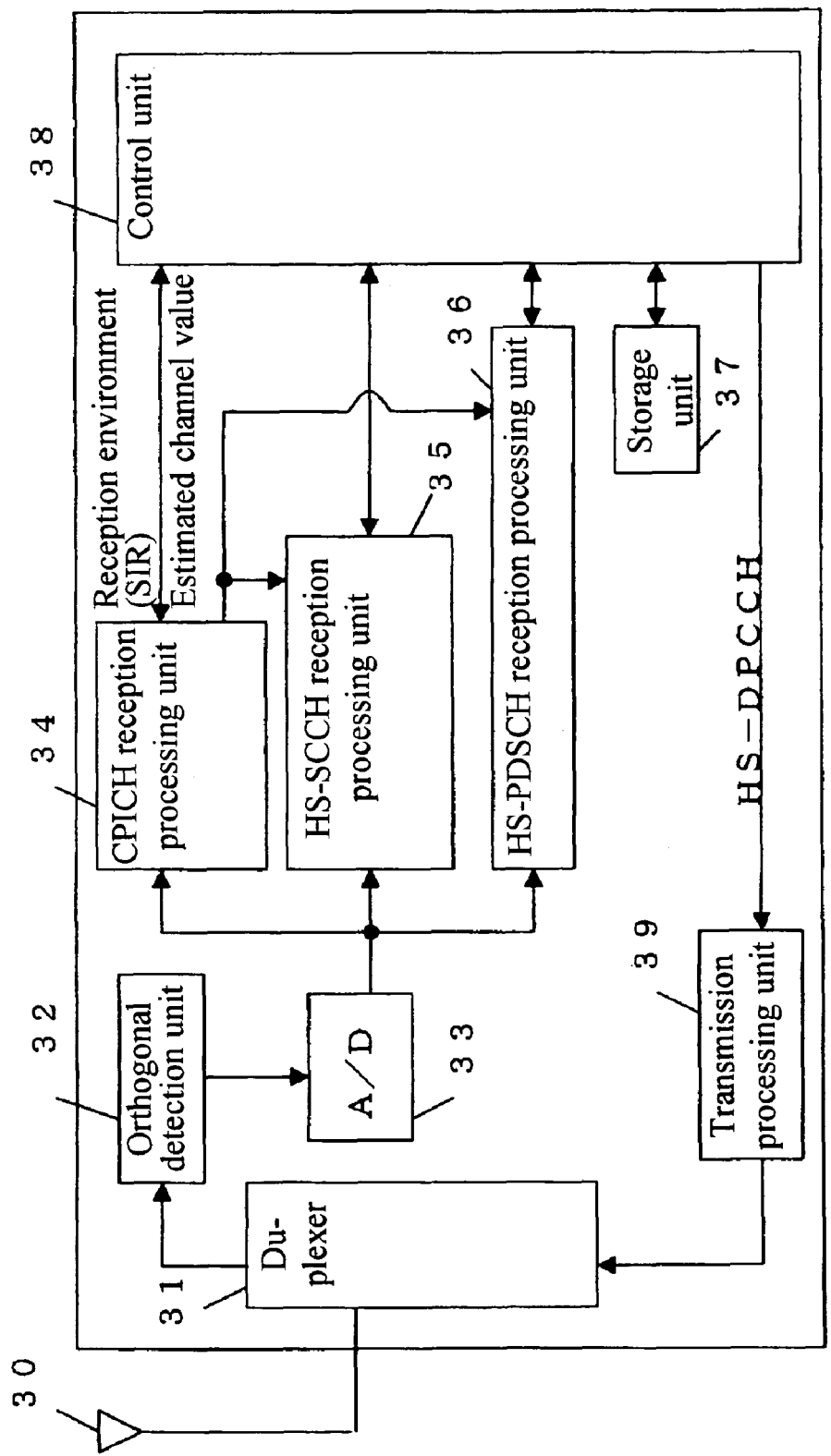
FIG. 4 is a drawing illustrating a mobile station according to the present invention.

FIG. 4 is a drawing illustrating a mobile station according to the present invention. A mobile station used in an HSDPA-compatible W-CDMA communication system as described above is presented as an example here. The present invention can also be applied to mobile stations in other communication systems so long as the principles of the present invention are followed.

Figure 3:
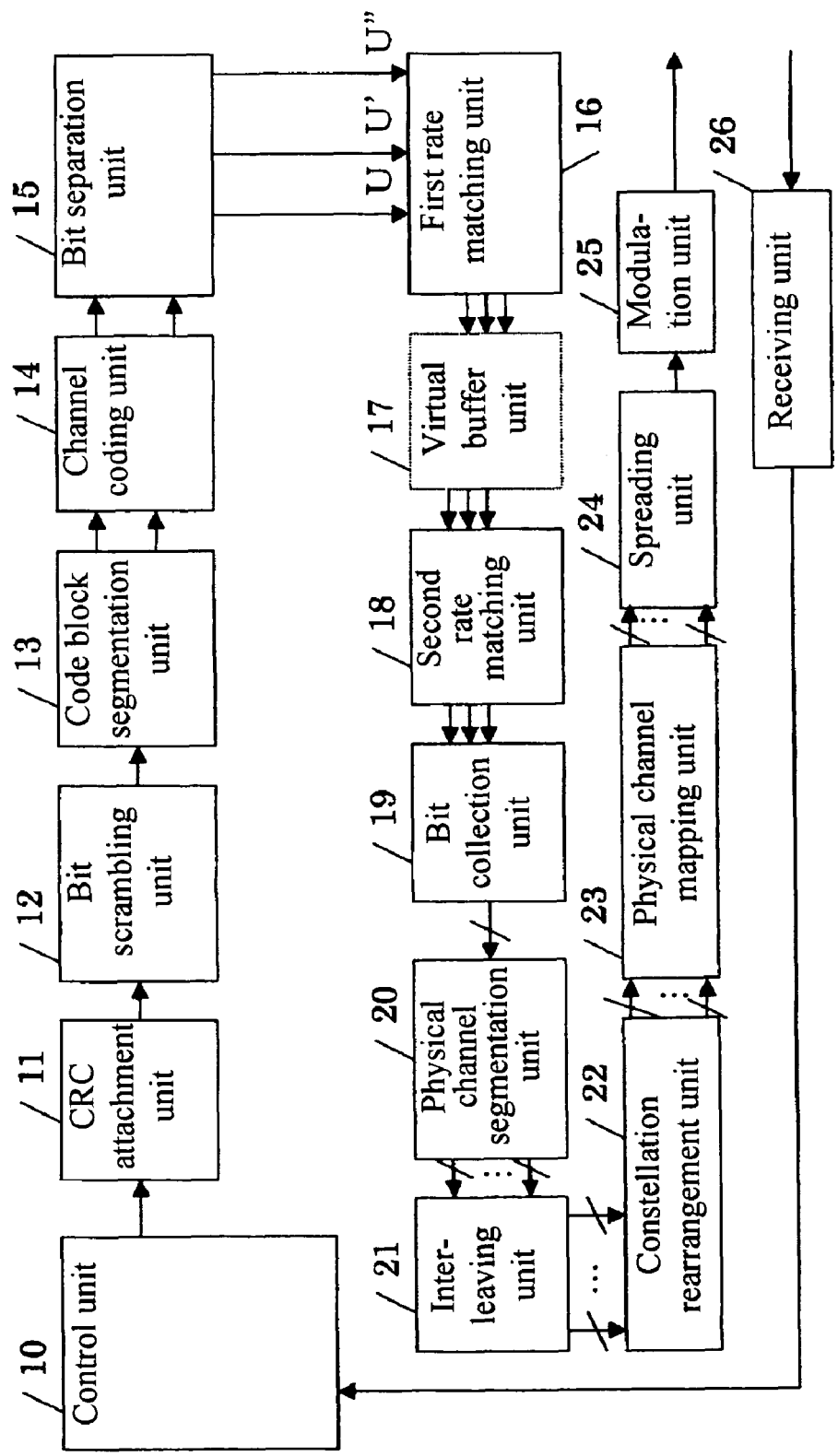
FIG. 3 is a drawing illustrating a transmission device (wireless base station).

The wireless communication device with which wireless communication is conducted can be a wireless base station as illustrated in FIG. 3, the operation of which is as described above.

In the drawing, 30 represents an antenna, 31 represents a duplexer, 32 represents an orthogonal detection unit, 33 represents and A/D conversion unit, 34 represents a CPICH reception processing unit, 35 represents an HS-SCCH reception processing unit, 36 represents an HS-PDSCH reception processing unit, 37 represents a storage unit, 38 represents a control unit, and 39 represents a transmission processing unit.

The mobile station receives downlink channels (e.g. CPICH, P-CCPCH, HS-SCCH, HS-PDSCH) by means of the antenna 30 and inputs the received signal via the duplexer 31 into the orthogonal detection unit 32 to perform orthogonal detection.

Subsequent to orthogonal detection, the signal is converted by the A/D conversion unit 33 into a digital signal. This makes it possible to perform subsequent processing in the digital domain.

The received signal, having been converted to a digital signal, is provided to the CPICH reception processing unit 34, HS-SCCH reception processing unit 35 and HS-PDSCH reception processing unit 36.

The CPICH reception processing unit 34 determines the reception environment used for specifying the CQI information which serves as a parameter used in adaptive modulation control at the base station. As an example, the SIR of the CPICH downlink signal may be determined. Furthermore, the CPICH reception processing unit 34, making use of the fact that the received CPICH is a known signal, computes a channel estimate for compensating for phase rotation, attenuation, etc. of the signal in the propagation path (channel compensation), and provides the channel estimate to the HS-SCCH reception processing unit 35 and HS-PDSCH reception processing unit 36. It is well known that a channel estimate is obtained by evaluating how much the received signal is displaced from a known signal point on a phase plane.

The reception environment is determined regularly, for example in the period from 4 slots until 1 slot before the slot in which CQI information is transmitted. Various cycles of determination are possible. For instance, one can perform the determination once per 20 ms, transmit the same determination result repeatedly in the first through fourth sub-frames, cease transmitting it in the remaining six sub-frames, perform one determination for the next wireless frame, and similarly perform transmission in specific sub-frames.

The HS-SCCH reception processing unit 35 is a reception processing unit for receiving signals transmitted via HS-SCCH as shown in FIG. 1, which performs reception processing such as de-spreading and decoding using a channel estimate for each first slot (first part) of HS-SCCH and provides the decoding result to the control unit 38.

The first slot (first part) is a slot in which a signal is transmitted which is obtained by convolution coding Xccs (Channelization Code Set information) and Mms (Modulation Scheme information) and multiplying by Xue (User Equipment identity). The HS-SCCH reception processing unit 35, after de-spreading, uses the given station's own Xue to perform the reverse of that computation, and then performs decoding, such as Viterbi decoding, and outputs the decoding result to the control unit 38.

If the control unit 38 determines based on the decoding result that the message was addressed to the station in question, a demodulation and decoding instruction for the second part will be issued by the control unit 38, so the HS-SCCH reception processing unit 35 will perform de-spreading and decoding on the remaining second and third slots (second part) of HS-SCCH, perform error detection (CRC error detection) processing on the decoded data, and output the decoding result and error detection result to the control unit 38.

The data obtained as the decoding result for the second part of HS-SCCH contains Xtbs (Transport Block Size information), Xhap (Hybrid ARQ Process information), Xrv (Redundancy and constellation Version), Xnd (New Data indicator), etc.

When the HS-SCCH reception processing unit 35 receives a message addressed to the station in question, the HS-PDSCH reception processing unit 36 is instructed by the control unit 38 to execute reception processing.

Therefore, following that instruction, it performs demodulation (de-spreading) and decoding on the received HS-PDSCH, performs error detection (CRC check result) on the decoded data, and outputs the decoding result and error detection result to the control unit 38.

Here, the information needed to perform reception processing is obtained by receiving it via HS-SCCH and is indicated via the control unit 38. For example, the control unit 38 may instruct the HS-PDSCH reception processing unit 36 to perform de-spreading with the de-spreading code set indicated by Xccs and to perform demodulation by the demodulation scheme corresponding to the modulation scheme indicated by Xms.

If the error detection result for HS-SCCH is that there was an error, there is a high possibility that the message was not addressed to the receiving station, and thus it is possible to discontinue demodulation and decoding of HS-PDSCH.

The storage unit 37 is used for storing data needed by the control unit 38. For instance, it may store a CQI table. The CQI table contains correlations between reception environment and the parameters (CQI values) used for adaptive modulation control.

The control unit 38 controls the operation of the various units (for example, by controlling the possibility of the operation by giving an enable signal or disable signal), acquires the reception SIR from the CPICH reception processing unit 34, acquires the decoding result and CRC check result from the HS-SCCH reception processing unit 35 and the decoding result and CRC check result from the HS-PDSCH reception processing unit 36, and executes specific processing based on these data.

For example, the control unit 38 may acquire CQI information corresponding to the acquired SIR by looking up information stored in the storage unit 37 and provide it to the transmission processing unit 39, thereby causing it to be transmitted in the second and third slots; determine if there is a message addressed to the station in question based on the decoding result from the HS-SCCH reception processing unit 35, and if so, instruct the HS-PDSCH reception processing unit 36 to perform demodulation and decoding; and generate an ACK signal or NACK signal according to the CRC check result from the HS-PDSCH reception processing unit 36 and provide that signal to the transmission processing unit 9.

As discussed above, the determination of the presence of a message addressed to the station in question can also be performed based on whether the path metric generated by the decoding is below a specific value.

The transmission processing unit 39 transmits the CQI information and ACK signal or NACK signal from the control unit 38 in a specific HS-DPCCH slot.

When the wireless base station instructs (for instance, via an announcement channel) that repeated transmission of ACK signals and NACK signals be performed, this instruction would be received by an unillustrated announcement channel reception unit, and based on this instruction, the control unit 38 would shift to repeat transmission mode, and instruct the transmission processing unit 39 to repeatedly transmit ACK signals and NACK signals.

Preferably, the instruction from the wireless base station will contain the number of repeated transmissions (n), but if such notification is not provided by the wireless base station, one may also preset it (e.g., by storing a flag indicating repeat transmission mode and the number of repeated transmissions (n) in the storage unit 37) and have the control unit 38 refer to this to find out that repeat transmission mode is on and what the number of repeated transmission n is.

When in repeat transmission mode, if it is detected that a message addressed to the receiving station was transmitted via HS-SCCH (notification detection), the control unit 38 of the mobile station provides control such that, when receiving the corresponding HS-PDSCH subframe and transmitting the reception result, the reception result is repeatedly transmitted n times, and reception processing is also performed for the next sub-frame after the HS-SCCH sub-frame in which the notification was detected (preferably, for n sub-frames after the HS-SCCH sub-frame in which the notification was detected).

Namely, the control unit 38 controls the HS-SCCH reception processing unit 35 so that the latter performs demodulation and decoding on this next sub-frame (n sub-frames).

As explained above, when the wireless base station has instructed that repeat transmission be performed or when the base station has been preset to repeat transmission mode, ACK signals and NACK signals are transmitted repeatedly from the mobile station.

Furthermore, if HS-PDSCH was transmitted to the mobile station in question, the base station performs control such that data is not transmitted via HS-PDSCH to the same mobile station until transmission of the number of sub-frames corresponding to the number of repeats (n) has been completed.

Consequently, with regard to HS-SCCH as well, the wireless base station would not transmit messages addressed to the same mobile station until transmission of the number of sub-frames corresponding to the number of repeats (n) has been completed.

Thus, in this invention the mobile station actively perform reception processing for sub-frames (the first part alone is sufficient for this purpose, but the second part can be included as well) subsequent to the sub-frame for which a notification was detected via HS-SCCH, and utilize the results of that reception processing.

A possible example of such utilization is determining the detection of notification for the preceding sub-frame to have been correct if the result of reception processing for the subsequent sub-frame is that no message addressed to the station in question (no notification) is detected.

Furthermore, the control unit 38 controls the transmission processing unit 39 such that the HS-PDSCH reception result corresponding to the HS-SCCH sub-frame for which detection was determined to be correct is transmitted via HS-DPCCH with the transmission timing of the reception result, and the transmission of the reception result is repeated n times in sub-sequent sub-frames, while if it was not determined that the detection was correct, such transmission is not performed.

By doing as described above, the channel via which notifications are conducted is actively received even in cases where the reception result is repeatedly transmitted, thus enabling the mobile station to effectively utilize the reception result and increasing the possibility of transmitting the reception result with the timing expected by the wireless base station.

The foregoing was an overview of the operation of the units shown in FIG. 4.

Moreover, the base station, based on the CQI information received via HS-DPCCH, performs subsequent transmissions using the corresponding transmission (modulation) scheme, transmits the next new data upon receipt of an ACK signal, and performs retransmission of the transmitted data in case of receiving a NACK signal or if no ACK signal is received within a specific time period after transmission. Here, in cases where the reception result is transmitted repeatedly, if an ACK signal is received once, it can be judged to mean that overall an ACK signal was transmitted, or the reception result which is received most over the repeated transmissions can be judged as being correct.

HS-SCCH Reception Processing

Next, the HS-SCCH reception processing procedure will be described in detail while referring to FIG. 1.

As explained above, when the wireless base station has instructed that repeat transmission be performed or when the base station has been preset to repeat transmission mode, ACK signals and NACK signals are transmitted repeatedly from the mobile station, so when HS-PDSCH has been transmitted to that mobile station, the wireless base station performs control such that the next HS-PDSCH will not be transmitted until the transmission of the number of sub-frames corresponding to the number of repeats (n) has been completed. Here, n is a natural number.

Also with regard to HS-SCCH, which notifies that data is to be transmitted, the wireless base station does not transmit data to the same mobile station until transmission of the number of sub-frames corresponding to the number of repeats has been completed.

In conjunction with this, reception processing (demodulation and decoding) of the first HS-SCCH sub-frame (A in FIG. 1) is performed in the HS-SCCH reception processing unit 35, and if, based on the result of that decoding, the control unit 38 determines that there was a notification (assuming that all sub-frames prior to the first sub-frame were determined to contain no notification), then the control unit 38 controls the HS-SCCH reception processing unit 35 such that reception processing (demodulation and decoding) will be performed also on the second HS-SCCH sub-frame (B in FIG. 1).

Consequently, when control unit 38 determines that there was a notification with regard to the first sub-frame (A) and that there was no notification with regard to the second sub-frame (B), it judges the decision that there was a notification in the first sub-frame (A) to have been correct and provides control such that demodulation and decoding are not carried out on the second HS-PDSCH sub-frame (F), and transmits the ACK signal or NACK signal constituting the reception result for the first HS-PDSCH sub-frame (E) in slot C as the reception result, not only in slot C of HS-DPCCH but also again in slot D.

Here, if the number of repeats is greater than 1, the reception result would be furthermore transmitted in the first slot of each sub-frame until the number of repeats is reached.

It is also possible to decide whether or not there was a notification with regard to the first sub-frame (A) based on the decoding result for the first part, or, for greater reliability, based on the result of error detection (e.g. presence or absence of CRC error) performed on received data including both the first part and second part.

The decision as to whether there was a notification with regard to the second sub-frame (B) can be made in the same way as the decision for the first sub-frame.

On the other hand, when the control unit 38 determines that there is a notification with respect to the first sub-frame (A) and also that there is a notification with regard to the second sub-frame (B), it decides which of the decisions has greater reliability, the decision of presence of notification with respect to the first sub-frame (A) or the presence of notification with respect to the second sub-frame (B).

Various decision parameters are possible: several examples will be illustrated below.

I HS-SCCH decoding result reliability information (e.g. path metric value in cases where Viterbi decoding is performed)

Namely, the smaller one of the path metric values obtained by decoding the first part of the first sub-frame (A) and of the second sub-frame (B) (the one with higher reliability of the decoding result) can be deemed correct as the sub-frame indicating the presence of a notification.

Of course, it is also possible to use the smaller of the path metric values (the one with higher reliability of the decoding result) for the second part instead of the first part as indicating which sub-frame is correct in indicating the presence of notification, and the reliability of both the first part and the second part can also be taken into consideration. As a method of taking into consideration the reliability of both the first part and the second part, one can for instance find the sum of the path metric value for the first part and the path metric value for the second part, and judge the sub-frame for which the sum is smaller (the one with higher reliability of decoding result) to be correct in indicating the presence of notification.

II HS-PDSCH decoding result reliability information (e.g. the value of the likelihood indicated by extrinsic information generated in the iterative decoding process in turbo decoding, or the error detection result for the decoding result)

Namely, turbo decoding is performed on the first sub-frame (E) of HS-PDSCH corresponding to the first sub-frame (A) of HS-SCCH and the second sub-frame (F) of HS-PDSCH corresponding to the second sub-frame (B) of HS-SCCH respectively, the likelihoods indicated by the extrinsic information obtained via the decoding (e.g. extrinsic information immediately prior to outputting the decoding result) are compared to each other, and the one with greater average likelihood (higher reliability) is determined to be more likely.

Then the determination of a notification being present that was made with regard to the sub-frame of HS-SCCH corresponding to the sub-frame of HS-PDSCH which was determined to be more likely is determined to be correct, while the determination of a notification being present that was made with regard to the other sub-frame is determined to be erroneous.

Furthermore, when using error detection results, turbo decoding is performed on the first sub-frame (E) of HS-PDSCH corresponding to the first sub-frame (A) of HS-SCCH and on the second sub-frame (F) of HS-PDSCH corresponding to the second sub-frame (B) of HS-SCCH, error detection processing (CRC error check) is performed on each of the decoding results, and the one judged to be error-free is determined to be more likely.

Then the determination of a notification being present that was made with regard to the sub-frame of HS-SCCH corresponding to the sub-frame of HS-PDSCH which was determined to be more likely is determined to be correct, while the determination of a notification being present that was made with regard to the other sub-frame is determined to be erroneous.

In the above manner, using various decision-making techniques, the sub-frame of the HS-SCCH sub-frames for which the determination of a notification being present is believed to be correct is specified, the HS-DPCCH slot in which the HS-PDSCH reception result (ACK or NACK signal) corresponding to that sub-frame is to be transmitted is specified, the reception result is transmitted in that slot, and transmission of the same reception result is repeated in the first slot of the next sub-frame. Of course, if the number of repeats is two or more, the reception result would be transmitted repeatedly until the number of repeats was reached.

On the other hand, a reception result is not transmitted (a DTX state is established) with regard to the HS-DPCCH slot corresponding to the HS-SCCH sub-frame for which the determination of a notification being present is believed to be incorrect. However, utilization for repeated transmission of reception results due to other determinations of a notification being present on HS-SCCH is permitted.

Control which puts the mobile station in a DTX state except for repeat transmissions in this manner is preferable because it makes it possible to prevent increased interference in the system due to transmission of unneeded reception results due to misdetection.

HS-SCCH Reception Processing Procedure

Figure 5:
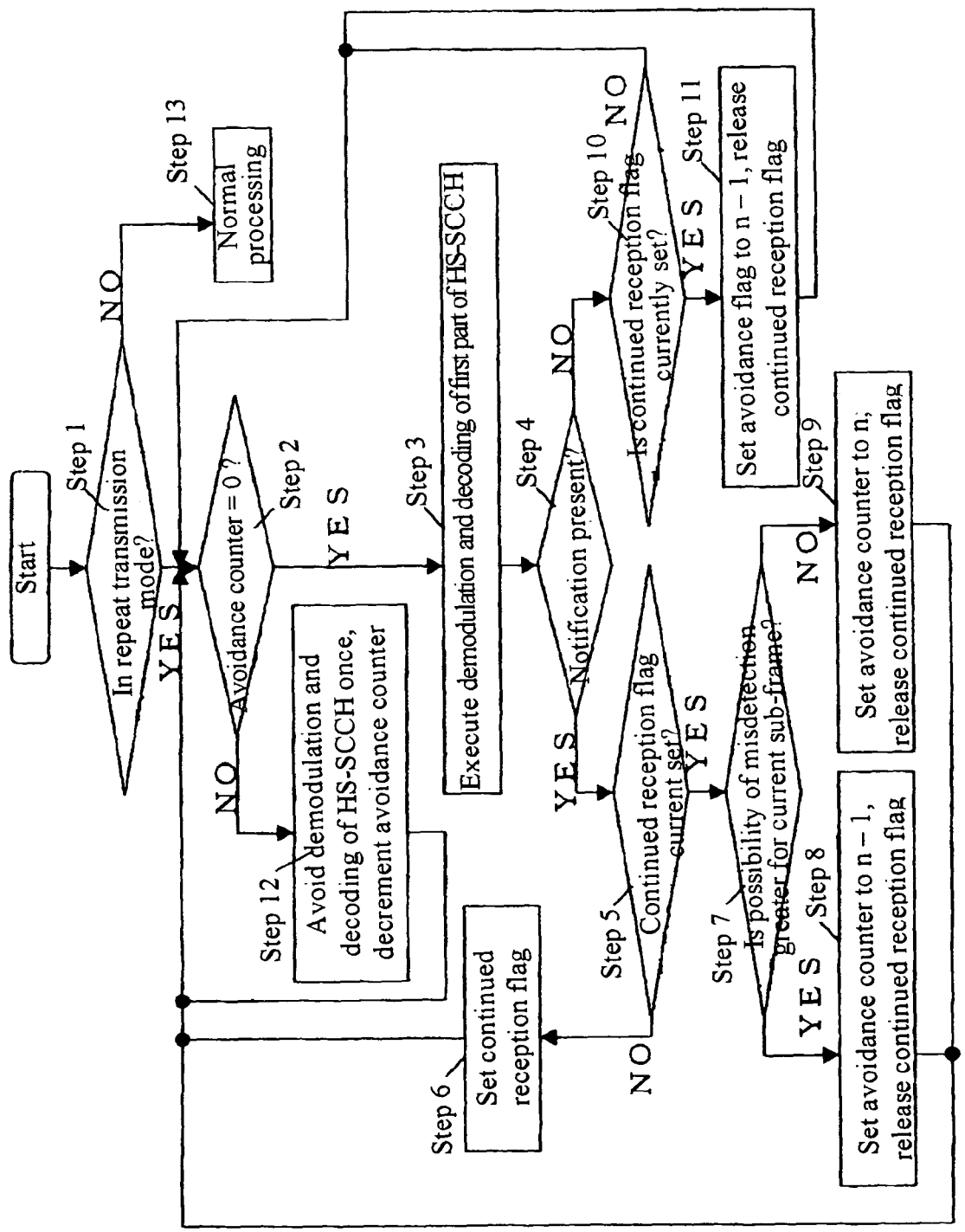
FIG. 5 is a drawing illustrating the HS-SCCH reception processing procedure in the mobile station according to the present invention.

Next, reception processing of HS-SCCH controlled by the control unit 38 will be described in detail as an example of the aforementioned processing while referring to FIG. 5. Power consumption in the mobile station will also be taken into consideration.

First, the control unit 38 determines whether repeat transmission mode is on (step 1).

There are cases where there will be an instruction from the wireless base station to shift to repeat transmission mode, or where it will be preset in the control unit 38, and the like.

If repeat transmission mode was determined to be on, the control unit 38 next determines if the avoidance counter in step 2 is 0 or not.

Since the avoidance counter is initially set to 0, the decision will be YES, and the control unit 38 will proceed to step 3.

In step 3, demodulation and decoding of the first part of HS-SCCH is attempted. The demodulation and decoding is performed by the control unit 38 by controlling the HS-SCCH reception processing unit 35 (e.g. by issuing an enable signal).

Being controlled to perform demodulation and decoding, the HS-SCCH reception processing unit 35 performs de-spreading with a de-spreading code corresponding to HS-SCCH for the first slot of each HS-SCCH sub-frame as shown in FIG. 1, performs decoding, such as Viterbi decoding, on the de-spread signal, and outputs the decoding result to the control unit 38.

For greater reliability, as explained above, the second part of HS-SCCH can also be demodulated and decoded and a CRC check can also be performed on the second and first parts.

Next, based on the decoding result (the CRC check can be used as well), the control unit 38 determines if there is a message (notification of data transmission) addressed to its station.

With regard to the determination, a notification can be determined to be present for example if the path metric value given by the decoding is smaller than a specific value.

To further increase the precision of detection of the presence/absence of notification, even if the path metric value is smaller than a specific value, one can also determine if Xccs and Xms are undefined bits or are within the capabilities of the mobile station, and judge there to be a notification if they are defined bits or are within the capabilities of the mobile station, or judge there to be no notification if they are undefined bits or are beyond the capabilities of the mobile station.

Here, if it is decided that a notification is present, one moves to step 5, and if it decided that there is no notification, one moves to step 10.

Although this is not illustrated, when moving to step 5, the HS-SCCH reception processing unit 35 is controlled to perform demodulation and decoding of the second part of HS-SCCH and a CRC error check of the first part and second part, and the HS-PDSCH reception processing unit 36 is controlled to perform demodulation and decoding of HS-PDSCH.

In step 5, it is determined whether the continued reception flag has been set.

When it is initially determined that a notification is present, the continued reception flag would not be set, so one would proceed to step 6, set the continued reception flag, and return to the decision of step 2.

Of course, the result of the HS-PDSCH decoding and the CRC error detection performed when moving to step 5 would be given to the control unit 38.

If on the other hand the continued reception flag is already set in step 6, one would move to step 7 and determine if the HS-SCCH sub-frame for which the possibility of misdetection is high is the previous one or the current one. For the determination technique, the previously indicated decision parameters (I and II) may be used.

If it is determined that that current HS-SCCH sub-frame has a greater possibility of misdetection, one proceeds to step 8, sets the avoidance counter to n−1, which is a value obtained by subtracting 1 from the number of repeats n, and releases (resets) the continued reception flag.

Of course, with regard to HS-PDSCH, one can also perform demodulation and decoding completely for the previous sub-frame and not perform demodulation or decoding at all for the current sub-frame.

The reason for setting the avoidance counter to n−1 is that the determination of a notification being present in the current HS-SCCH sub-frame is believed to be erroneous, and using the previous HS-SCCH sub-frame as reference and not performing HS-SCCH reception processing (demodulation and decoding) for the subsequent n sub-frames is favorable in that it reduces power consumption in the mobile station.

Therefore, the error detection result (CRC check result) for the decoding result of the previous HS-PDSCH sub-frame is transmitted as the reception result (ACK or NACK signal) in the HS-DPCCH slot corresponding to the previous HS-PDSCH sub-frame, and is repeatedly transmitted in the first slot of each subsequent sub-frame until the number of repeats n is reached; meanwhile, the previous HS-SCCH sub-frame is used as reference and HS-SCCH reception processing (demodulation and decoding) is not performed for the subsequent n sub-frames.

It should be noted that, since demodulation and decoding have already been performed on the current sub-frame (especially the first part), it is not subject to reception processing avoidance. The second part of the current subframe can be received if necessary, as explained above.

If on the other hand it is determined that the previous HS-SCCH sub-frame has a greater possibility of misdetection, one proceeds to step 9, sets the avoidance counter to the number of repeats n, and releases (resets) the continued reception flag.

The reason for setting the avoidance counter to n is that the determination of a notification being present in the previous HS-SCCH sub-frame is believed to be erroneous, and using the current HS-SCCH sub-frame as reference and not performing HS-SCCH reception processing (demodulation and decoding) for the subsequent n sub-frames is favorable in that it reduces power consumption in the mobile station.

Of course, with regard to HS-PDSCH, one can also perform demodulation and decoding completely for the current sub-frame but demodulation or decoding is not required for previous sub-frame.

Therefore, the error detection result (CRC check result) for the decoding result of the current HS-PDSCH sub-frame is transmitted as the reception result (ACK or NACK signal) in the HS-DPCCH slot corresponding to the current HS-PDSCH sub-frame, and is repeatedly transmitted in the first slot of each subsequent sub-frame until the number of repeats n is reached; meanwhile, the current HS-SCCH sub-frame is used as reference and HS-SCCH reception processing (demodulation and decoding) is not performed for the subsequent n sub-frames.

Now, if it is determined in step 4 that no notification is present, one proceeds to step 10 and determines if the continued reception flag is currently set.

Here, if the continued reception flag is currently set, one proceeds to step 11, and if it is not currently set, one returns to the decision of step 2.

In step 11, the avoidance counter is set to n−1, which is a value obtained by subtracting 1 from the number of repeats, and the continued reception flag is released (reset).

Of course, with regard to HS-PDSCH, one can also perform demodulation and decoding completely for the previous sub-frame but demodulation or decoding is not required for previous sub-frame.

The reason for setting the avoidance counter to n−1 is that the determination of a notification being present in the previous HS-SCCH sub-frame is judged to be correct, and using the previous HS-SCCH sub-frame as reference and not performing HS-SCCH reception processing (demodulation and decoding) for the subsequent n sub-frames is favorable in that it reduces power consumption in the mobile station.

Therefore, the error detection result (CRC check result) for the decoding result of the previous HS-PDSCH sub-frame is transmitted as the reception result (ACK or NACK signal) in the HS-DPCCH slot corresponding to the previous HS-PDSCH sub-frame, and is repeatedly transmitted in the first slot of each subsequent sub-frame until the number of repeats n is reached.

It should be noted that, since demodulation and decoding have already been performed on the current sub-frame (especially the first part), it is not subject to reception processing avoidance. The second part of the current subframe can be received if necessary, as explained above.

If the avoidance counter was set to 1 or more in steps 8, 9, or 11, step 2 will give a NO decision, and one will proceed to step 12.

In step 12, demodulation and decoding of the next HS-SCCH sub-frame is avoided once, the avoidance counter is reduced by 1, and one returns again to the decision of step 2.

Therefore, the flow proceeds to step 12 and avoidance is executed until the avoidance counter becomes 0.

If it was determined in step 1 that repeat transmission mode is off, one proceeds to step 13 and normal processing is performed.

"Normal Processing"

Figure 6:
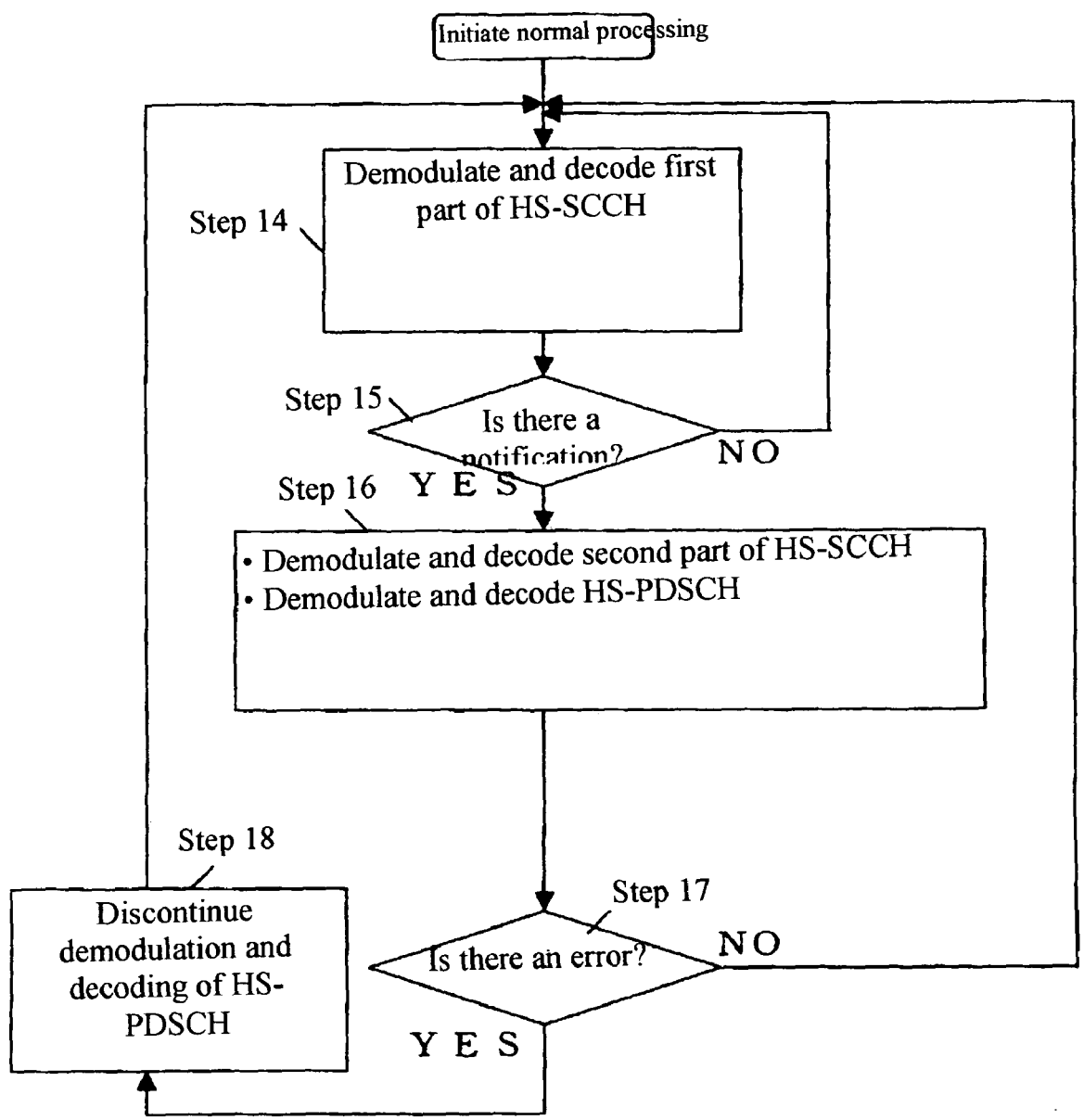
FIG. 6 is a drawing illustrating normal processing in a mobile station according to the present invention.

Next, the normal processing procedure for HS-SCCH in the mobile station will be described in detail using FIG. 6. The decision processing here is carried out in the control unit 38.

First, control unit 38 moves to step 14 and attempts demodulation and decoding of the first part of HS-SCCH. The demodulation and decoding is performed by the control unit 38 by controlling the HS-SCCH reception processing unit 35 (e.g. by issuing an enable signal).

Being controlled to perform demodulation and decoding, the HS-SCCH reception processing unit 35 performs de-spreading with a de-spreading code corresponding to HS-SCCH on the first slot of each HS-SCCH sub-frame as shown in FIG. 1, performs decoding, such as Viterbi decoding, on the de-spread signal, and outputs the decoding result to the control unit 38.

The control unit 38 determines, based on the decoding result, if there is a message addressed to its station (notification of data transmission) (step 15). With regard to the determination, a notification can be determined to be present for example if the path metric value obtained in the decoding process is smaller than a specific value.

To further increase the precision of detection of the presence/absence of notification, one can also determine if Xccs and Xms are undefined bits or are within the capabilities of the mobile station, and judge there to be a notification if they are defined bits or are within the capabilities of the mobile station, or judge there to be no notification if they are undefined bits or are beyond the capabilities of the mobile station.

Here, if it decided that a notification is present, one proceeds to step 16, and if it decided that there is no notification, one returns to step 14 and reception processing of the first part of the next HS-SCCH sub-frame is performed.

In step 16, the HS-SCCH reception processing unit 35 is controlled to perform demodulation and decoding of the second part of HS-SCCH, and the HS-PDSCH reception processing unit 36 is controlled to perform demodulation and decoding of HS-PDSCH.

Therefore, the HS-SCCH reception processing unit 35 de-spreads and performs decoding on the second and third slots which follow the first slot of HS-SCCH.

Furthermore, the HS-PDSCH reception processing unit 36 de-spreads HS-PDSCH, which is transmitted with a 2-slot delay relative to HS-SCCH, using the de-spreading code indicated on HS-SCCH, and performs decoding, such as turbo decoding, of HS-PDSCH.

Once decoding of the second part of HS-SCCH is completed by the processing of step 16, the HS-SCCH reception processing unit 35 performs a CRC error check on the entire HS-SCCH sub-frame, and it is determined if the decision in step 3 was correct (step 17).

Here, if there was an error (if a CRC error is present), the detection of notification in step 3 is taken to be erroneous, so if HS-PDSCH demodulation and decoding was being executed, it is discontinued (step 18) and one returns to step 14 to perform reception processing of the next HS-SCCH sub-frame.

If it is determined in step 17 that there is no error (CRC error), control unit 38 returns to step 14, performs demodulation and decoding of the first part of the next HS-SCCH sub-frame, as well as causing the demodulation and decoding of HS-PDSCH initiated in step 16 to be completed and performing error detection on the decoding result.

Here, if the control unit 38 is notified that there is an error, it generates an ACK signal and controls the transmission processing unit 39 to transmit an NACK signal once via HS-DPCCH corresponding to the subframe of HS-SCCH for which presence of notification was detected. If there is no error, a ACK signal is generated instead of an NACK signal and is transmitted once.

The wireless base station then performs retransmission control according to the ACK signals and NACK signals, which are transmitted only once (are not transmitted repeatedly).

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A mobile station which receives a first datum and transmits a first reception result with a first timing when a first notification is received via a channel which notifies that data is to be transmitted, and receives a second datum and transmits a second reception result with a second timing when a second notification with a different timing is received via said channel, said mobile station comprising:
a repeat transmission unit which, upon receiving said first notification, transmits said first reception result with said first timing, and repeats transmission of said first reception result with said second timing; and
a control unit which performs control such that, upon receiving said first notification, reception processing is performed before completion of repeated transmission of said first reception result with said different timing on said channel which notifies that data is to be transmitted, wherein the control unit determines that a message addressed to the receiving station was transmitted based on the result of the reception processing with regard to a first sub-frame and a second sub-frame in the channel which notifies that data is to be transmitted.

2. A mobile station as set forth in claim 1, wherein said reception processing includes demodulation and decoding.

3. An HSDPA-compatible mobile station which, upon detecting that a message addressed to that mobile station is transmitted via HS-SCCH, receives the corresponding HS-PDSCH sub-frame, and which, when transmitting the reception result, repeats the transmission of said reception result n times, said mobile station comprising:
a control unit which provides control such that reception processing is performed on the second sub-frame that comes next after the first sub-frame of HSSCCH on which said detection was performed;
wherein the second sub-frame comes before completion of n-th transmission of said reception result, and wherein the control unit determines that a message addressed to the receiving station was transmitted based on the result of the reception processing with regard to a first sub-frame and a second sub-frame in the channel which notifies that data is to be transmitted.

4. A mobile station as set forth in claim 3, wherein said control unit determines said detection for said first sub-frame to have been correct when reception processing was performed on said second sub-frame but said detection was not achieved with said second sub-frame.

5. A mobile station as set forth in claim 4, wherein
said control unit, upon making said determination, performs control which causes the reception result to be transmitted in a specific slot of HS-DPCCH corresponding to said first sub-frame, and causes the transmission of said reception result to be repeated n times in slots of subsequent sub-frames.

6. A mobile station as set forth in claim 3, wherein
when said detection was achieved also for said second sub-frame as a result of the reception processing for said second sub-frame, said control unit determines whether the detection of said first sub-frame or of said second sub-frame is more likely.

7. A mobile station as set forth in claim 6, wherein
said control unit provides control such that the reception result is transmitted in the corresponding slot of HS-DPCCH which corresponds to the sub-frame determined to be more likely in said determination.

8. A mobile station as set forth in claim 6, wherein
said control unit performs control such that, except for the transmission of reception results for repeats, reception results are not transmitted in the corresponding slot of HS-DPCCH which corresponds to the subframe which was not determined to be less likely in said determination.

9. A mobile station as set forth in claim 6, wherein
said control unit performs control such that the reception result is caused to be transmitted in the corresponding HS-DPCCH slot which corresponds to the subframe determined to be more likely in said determination, and transmission of said reception result is furthermore repeated n times in slots of subsequent sub-frames.

10. A mobile station as set forth in claim 6, wherein
said control unit performs said determination based on reliability information for the result of decoding of said first sub-frame and on reliability information for the result of decoding of said second sub-frame.

11. A mobile station as set forth in claim 6, wherein
said control unit performs said determination based on reliability information for the result of decoding of the HS-PDSCH sub-frame corresponding to said first sub-frame and on reliability information for the result of decoding of the HS-PDSCH sub-frame corresponding to said second sub-frame.

* * * * *